(12) United States Patent
Kresse et al.

(10) Patent No.: US 7,930,581 B2
(45) Date of Patent: *Apr. 19, 2011

(54) AUTOMATION DEVICE

(75) Inventors: Heiko Kresse, Obernkirchen (DE); Andreas Stelter, Minden (DE); Ralf Schaeffer, Hille (DE)

(73) Assignee: ABB Patent GmbH, Ladenburg (DE)

( * ) Notice: Subject to any disclaimer, the term of this patent is extended or adjusted under 35 U.S.C. 154(b) by 1147 days.

This patent is subject to a terminal disclaimer.

(21) Appl. No.: 11/511,699

(22) Filed: Aug. 29, 2006

(65) Prior Publication Data

US 2007/0115851 A1    May 24, 2007

(30) Foreign Application Priority Data

Sep. 13, 2005   (DE) .......................... 10 2005 043 485

(51) Int. Cl.
*G06F 1/14* (2006.01)
*G06F 1/03* (2006.01)

(52) U.S. Cl. ................ 713/600; 713/1; 713/2; 713/100; 713/400; 713/401; 713/500; 713/501; 713/502; 713/503; 713/601; 332/100

(58) Field of Classification Search .................. 713/1, 2, 713/100, 400–401, 500–503, 600–601; 332/100–143
See application file for complete search history.

(56) References Cited

U.S. PATENT DOCUMENTS

| | | | |
|---|---|---|---|
| 4,075,558 A | 2/1978 | Harzer | |
| 4,099,030 A | 7/1978 | Hirata | |
| 4,104,637 A | 8/1978 | Nielson | |
| 4,259,648 A * | 3/1981 | Farrow | 332/101 |
| 4,287,565 A | 9/1981 | Haubner et al. | |
| 4,438,523 A | 3/1984 | Brandl | |
| 4,521,879 A | 6/1985 | Gueldenpfennig et al. | |
| 4,533,874 A | 8/1985 | Fischer | |
| 4,541,110 A | 9/1985 | Hopf et al. | |
| 4,549,044 A | 10/1985 | Durham | |
| 4,586,121 A | 4/1986 | Gilliam | |
| 4,663,709 A | 5/1987 | Fujiwara et al. | |
| 4,672,361 A | 6/1987 | Kokubo et al. | |
| 4,724,534 A * | 2/1988 | Guzman-Edery et al. | 375/303 |
| 4,749,962 A | 6/1988 | Doornenbal | |
| 4,773,083 A | 9/1988 | Baumbach et al. | |
| 5,048,058 A | 9/1991 | Kaleh | |
| 5,103,463 A * | 4/1992 | Schoeneberg | 375/278 |
| 5,121,723 A | 6/1992 | Stepper et al. | |
| 5,124,976 A | 6/1992 | Lemaistre et al. | |
| 5,225,787 A | 7/1993 | Therssen | |
| 5,230,012 A | 7/1993 | Schenk | |
| 5,233,642 A | 8/1993 | Renton | |
| 5,235,622 A | 8/1993 | Yoshida | |
| 5,239,974 A | 8/1993 | Ebinger et al. | |
| 5,260,975 A | 11/1993 | Saito | |
| 5,341,249 A | 8/1994 | Abbott et al. | |
| 5,341,379 A * | 8/1994 | Crisp | 714/709 |

(Continued)

*Primary Examiner* — Thomas Lee
*Assistant Examiner* — Fahmida Rahman
(74) *Attorney, Agent, or Firm* — Paul R. Katterle; Michael C. Prewitt; Robert P. Nupp

(57) ABSTRACT

The invention relates to an automation device, with which a multiplicity of physically distributed functional units communicate with each other by means of a common transmission protocol. The device has a microcontroller (110), which is assigned at least one clock generator (120) and one memory unit (150), and which is connected at least to one data source (140), which is designed to output a data bit-stream to be transmitted.

4 Claims, 2 Drawing Sheets

U.S. PATENT DOCUMENTS

| | | |
|---|---|---|
| 5,555,531 A | 9/1996 | Booth et al. |
| 5,584,619 A | 12/1996 | Guzzella |
| 5,602,879 A | 2/1997 | Wada |
| 5,652,755 A | 7/1997 | Carey |
| 5,661,759 A | 8/1997 | Tulai |
| 5,710,721 A | 1/1998 | Rieckhoff et al. |
| 5,764,891 A | 6/1998 | Warrior |
| 5,789,991 A | 8/1998 | Ishii |
| 5,920,715 A | 7/1999 | Heckel et al. |
| 5,963,332 A | 10/1999 | Feldman et al. |
| 6,107,763 A | 8/2000 | Rossi |
| 6,230,021 B1 | 5/2001 | Ohdachi |
| 6,278,357 B1 | 8/2001 | Croushore et al. |
| 6,286,020 B1 | 9/2001 | Eastty et al. |
| 6,307,490 B1 | 10/2001 | Litfin |
| 6,308,057 B1 * | 10/2001 | Hayashi ................. 455/324 |
| 6,438,176 B1 * | 8/2002 | Haran et al. ............. 375/303 |
| 6,629,059 B2 | 9/2003 | Borgeson et al. |
| 6,650,712 B1 | 11/2003 | Leonidov et al. |
| 6,675,236 B2 | 1/2004 | Moon et al. |
| 6,759,954 B1 | 7/2004 | Myron et al. |
| 6,813,318 B1 | 11/2004 | Westfield et al. |
| 6,888,879 B1 | 5/2005 | Lennen |
| 6,889,282 B2 | 5/2005 | Schollenberger |
| 6,904,476 B2 | 6/2005 | Hedtke |
| 6,959,356 B2 | 10/2005 | Packwood et al. |
| 7,012,561 B2 | 3/2006 | Toennesen et al. |
| 7,027,952 B2 | 4/2006 | Dela Cruz et al. |
| 7,050,525 B2 | 5/2006 | Adachi et al. |
| 7,358,781 B2 * | 4/2008 | Kresse et al. ............. 327/113 |
| 7,359,812 B2 | 4/2008 | Kresse et al. |
| 7,372,914 B2 | 5/2008 | Calvin |
| 7,386,052 B2 | 6/2008 | Kresse et al. |
| 7,426,452 B2 | 9/2008 | Zielinski et al. |
| 7,447,552 B2 | 11/2008 | Kresse et al. |
| 7,864,675 B2 | 1/2011 | Kresse et al. |
| 2001/0030997 A1 | 10/2001 | Yang et al. |
| 2002/0101943 A1 | 8/2002 | Proctor |
| 2003/0065855 A1 | 4/2003 | Webster |
| 2004/0146126 A1 | 7/2004 | Wheatley et al. |
| 2004/0151269 A1 | 8/2004 | Balakrishnan et al. |
| 2004/0239525 A1 | 12/2004 | Kobayashi |
| 2005/0072227 A1 | 4/2005 | Carter |
| 2005/0089120 A1 | 4/2005 | Quinlan et al. |
| 2005/0129147 A1 | 6/2005 | Cannon et al. |
| 2005/0195093 A1 | 9/2005 | Karschnia et al. |
| 2005/0264446 A1 | 12/2005 | Underbrink et al. |
| 2007/0115851 A1 | 5/2007 | Kresse et al. |
| 2007/0115852 A1 * | 5/2007 | Kresse et al. ............. 370/252 |
| 2007/0116133 A1 | 5/2007 | Kresse et al. |
| 2007/0118686 A1 | 5/2007 | Kresse et al. |
| 2007/0136538 A1 | 6/2007 | Kresse et al. |
| 2007/0150625 A1 | 6/2007 | Kresse et al. |
| 2007/0150626 A1 | 6/2007 | Kresse et al. |

* cited by examiner

US 7,930,581 B2

AUTOMATION DEVICE

CROSS REFERENCE TO RELATED APPLICATION

This application claims priority from German Application DE 10 2005 043 485.1 filed on Sep. 13, 2005 the contents of which are relied upon and incorporated herein by reference in their entirety, and the benefit of priority under 35 U.S.C. 119 is hereby claimed.

BACKGROUND OF THE INVENTION

The invention relates to an automation device, with which a multiplicity of physically distributed functional units communicate with each other by means of a common transmission protocol. These functional units manifest themselves as field devices or operator units according to their automation function.

For some time now it has been common practice in instrumentation and control engineering to use a two-wire line to supply a field device and to transfer measurements from this field device to a display device and/or to an automation control system, or transfer control values from an automation control system to the field device. Each measurement or control value is converted into a proportional DC current, which is superimposed on the DC supply current, where the DC current representing the measurement or control value can be a multiple of the DC supply current. Thus the supply current consumption of the field device is usually set to approximately 4 mA, and the dynamic range of the measurement or control value is mapped onto currents between 0 and 16 mA, so that the known 4 to 20 mA current loop can be used.

More recent field devices also feature universal properties that are largely adaptable to the given process. For this purpose, an AC transmission path capable of bi-directional operation is provided in parallel with the unidirectional DC transmission path, via which parameterization data are transferred in the direction to the field device and measurements and status data are transferred from the direction of the field device. The parameterization data and the measurements and status data are modulated on an AC voltage, preferably frequency modulated.

In process control engineering, it is common in the field area as it is called, to arrange and link field devices, i.e. measurement, control and display modules, locally according to the specified safety requirements. These field devices have analog and digital interfaces for data transfer between them, where data transfer takes place via the supply lines of the power supply arranged in the control area. Operator units are also provided in the control area, as it is called, for controlling and diagnosing these field devices remotely, where lower safety requirements normally apply.

Data transfer between the operator units in the control area and the field devices is implemented using FSK modulation (Frequency Shift Keying) superimposed on the known 20 mA current loops, where two frequencies, assigned to the binary states "0" and "1", are transferred in frames as analog signals.

The general conditions for the FSK signal and the type of modulation are specified in the "HART Physical Layer Specification Revision 7.1-Final" dated Jun. 20, 1990 (Rosemount Document no. D8900097; Revision B).

ASICs specifically developed to implement the FSK interface according to the HART protocol, such as the HT2012 from the SMAR company, are commercially available and in common use. The disadvantage with these special circuits is the permanently fixed range of functions and the associated lack of flexibility to adapt to changing requirements.

Known modern automation devices are usually equipped with a processing unit known as a microcontroller, which is used to perform the correct data processing for the automation task of the functional unit concerned.

The aim is to reproduce the functions of the FSK interface according to the HART protocol in the controller of the processing unit of the automation devices, without impairing in the process the automation task of the functional unit concerned.

SUMMARY OF THE INVENTION

Hence the object of the invention is specifically to define means for converting a data bit-stream into an FSK signal using a microcontroller known per se.

The invention is based on a processing unit, which is assigned at least one memory unit for storing instructions and data. Connected to this processing unit is a digital-to-analog converter whose output is connected to a filter. A first and a second table are stored in the memory unit. The first table has equidistant samples at a first frequency. The second table has equidistant samples at a second frequency which is different from the first frequency.

In this case, the timing pattern is selected in such a manner that output starts at a multiple of a 60° phase angle of the lower signal frequency. This achieves continuous changeover between the two signal frequencies.

BRIEF DESCRIPTION OF THE DRAWING

The invention is explained in more detail below with reference to an exemplary embodiment. In the drawings required for this.

DETAILED DESCRIPTION OF ILLUSTRATIVE EMBODIMENTS

Figure 1:
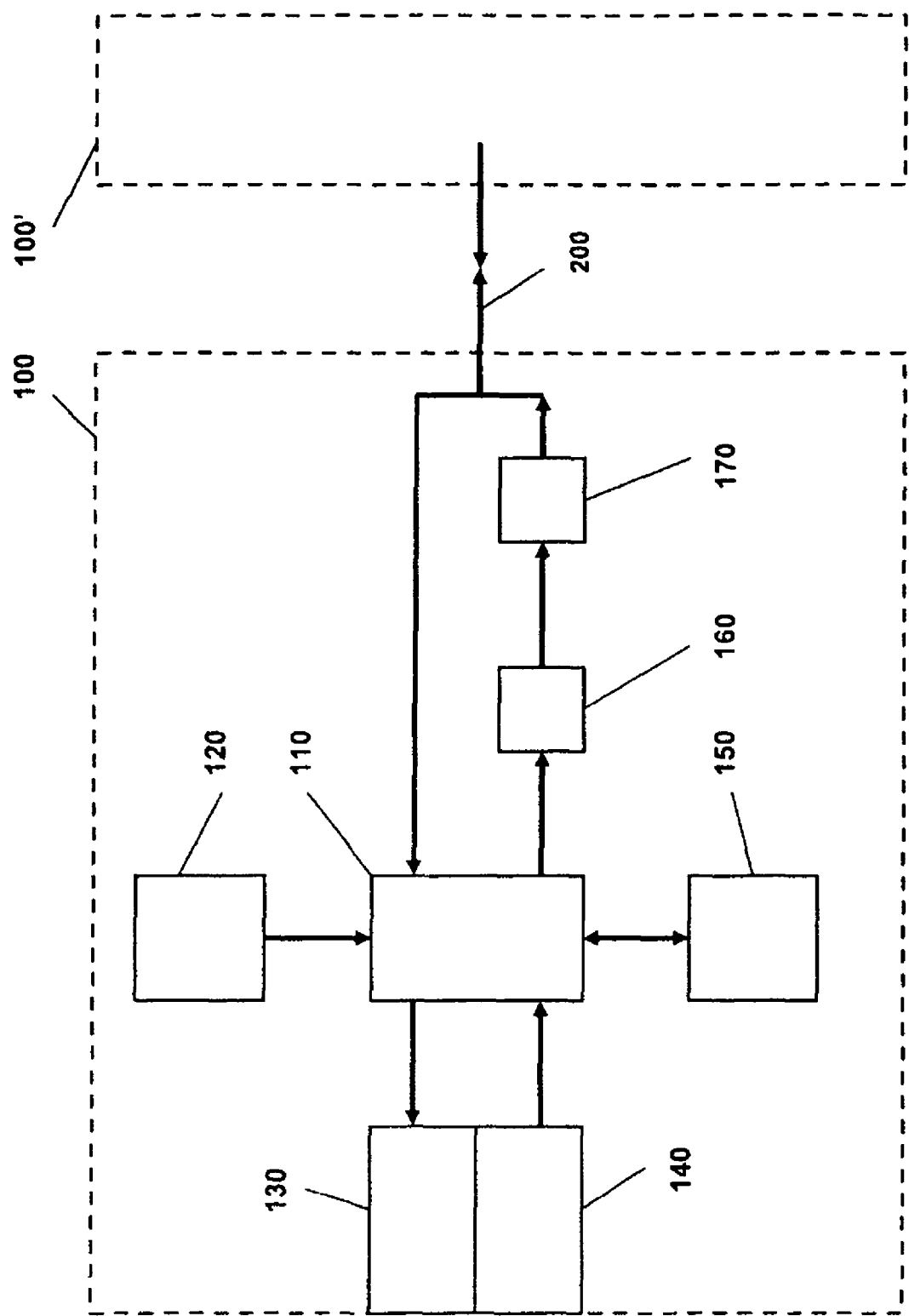
FIG. 1 shows a block diagram of an automation device

FIG. 1 shows schematically an automation device 100 to the extent necessary to understand the present invention. The automation device 100 is connected via a communications line 200 to an automation device 100' of substantially the same type. The communications line 200 is used bi-directionally. The information sent by the automation device 100 is received by the automation device 100', and vice versa. Hence reference is only made below to the automation device 100 shown in detail.

A core component of the automation device 100 is a controller 110, which is connected at least to one memory unit 150 and one timing element, referred to below as a clock generator 120 for the sake of simplicity. Usually, however, parts of the clock generator 120 are already implemented in the controller 110.

The controller 110 has connections for connecting a data sink 130 and a data source 140.

A configurable and/or parameterizable sensor for converting a physical variable into an electrical variable can be provided as the data source 140, in which case the configuration and/or parameterization is the data sink 130.

In an alternative embodiment, it can be provided that the data sink 130 is an actuator for converting an electrical variable into a physical variable whose properties can be diagnosed. The diagnostic device provided for this purpose is then the data source 140.

In a further embodiment, it can be provided that the automation device 100 is part of a higher-level device designed for bi-directional communication with additional automation devices 100'. In this embodiment, the higher-level device is both the data source 140 and the data sink 130.

In a further embodiment, the automation device 100 can be designed as a "protocol converter". In this embodiment, the data source 140 and the data sink 130 are formed by a second communications system.

To implement the invention, however, it is sufficient for the data source 140 to be present without the data sink 130.

In addition, connected to the controller 110 is a digital-to-analog converter 160 whose output is connected to a filter 170. The output of the filter 170 is connected to the communications line 200. In addition, the communications line 200 is taken to the input terminals of the controller 110, via which terminals it is provided that the line signal on the communications line 200 is received.

Figure 2:
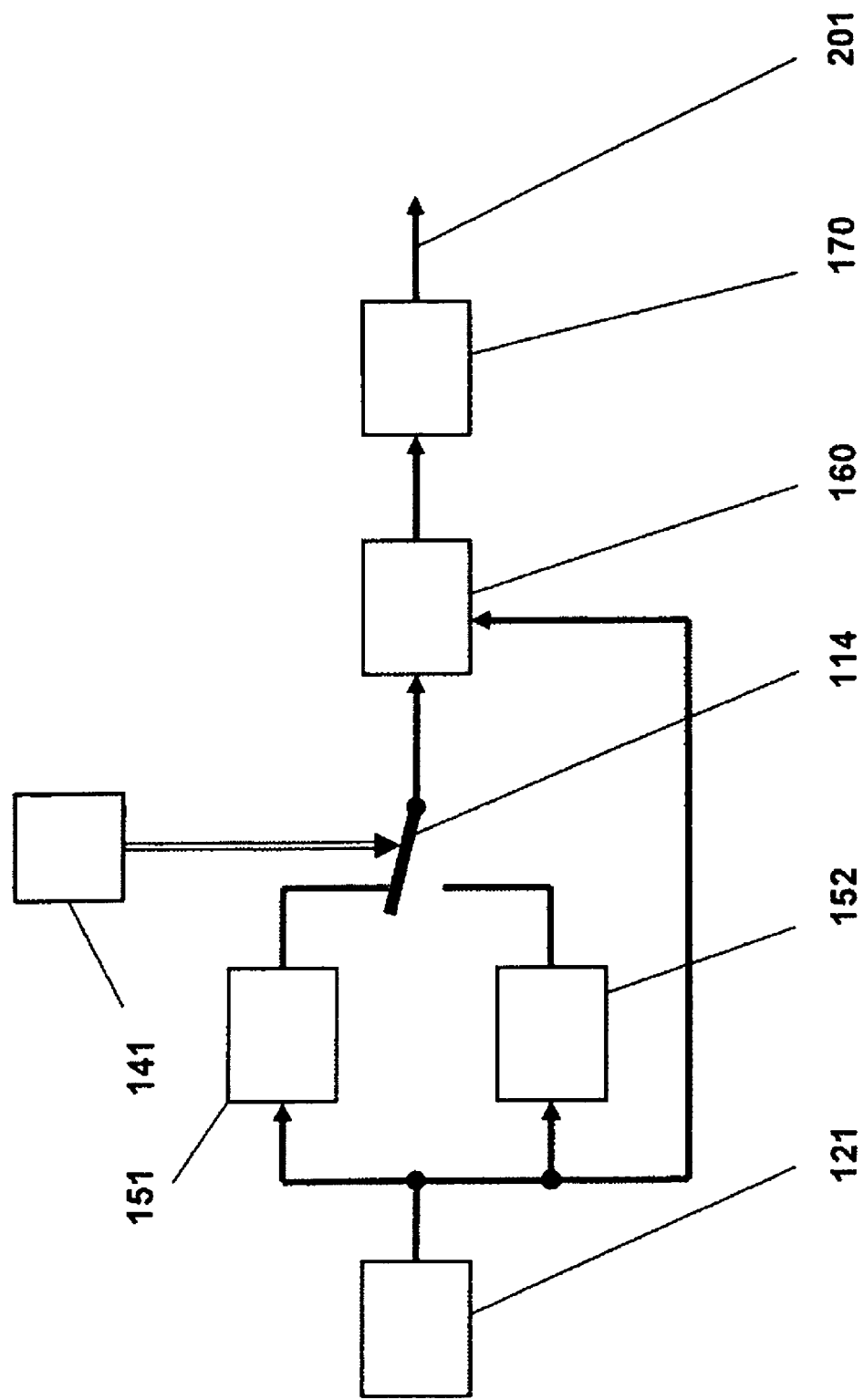
FIG. 2 shows a schematic diagram for converting a data bit-stream into an FSK signal

The method of operation of the invention will be explained in more detail below. To this end, FIG. 2, using the same references for the same means, schematically shows a schematic diagram for converting a data bit-stream into an FSK signal.

Depending on the data bit-stream of the transmission data 141 which are kept ready in the data source 140, and for the purpose of outputting the samples-symbolized by the switch 114—the process changes between the first table 151 and the second table 152 in order to output a logic one or in order to output a logic zero. The switch 114 is formed by a program function of the controller 110.

In this case, the timing pattern of clock 121 is selected in such a manner that output starts at a multiple of a 60° phase angle of the lower signal frequency. This achieves continuous changeover between the two signal frequencies.

To this end, each table is divided into six areas, the respective first samples of each table being set to a phase shift of 60°.

The digital-to-analog converter 160 is used to convert the samples into an analog, largely sinusoidal signal whose curve shape is optimized in the downstream filter 170. The filter 170 is in the form of a second-order low-pass filter. The FSK signal 201 can be tapped off at the output of the filter 170.

In a special refinement of the invention, the connected digital-to-analog converter 160 is a pulse-width-modulated digital-to-analog converter. To this end, the output clock for outputting the samples is led to the digital-to-analog converter 160.

The power requirement of such a converter is advantageously particularly low, thus complying with use in remote-supply field devices.

What is claimed is:

1. An automation device, with which a multiplicity of physically distributed functional units communicate with each other by means of a common transmission protocol, the automation device comprising: a microcontroller, which is assigned at least one clock generator and one memory unit, and which is connected at least to one data source, which is designed to output a data bit-stream to be transmitted, wherein a first table includes a sequential sequence of equidistant samples having a first frequency and a second table includes a sequential sequence of equidistant samples at a second frequency, said first and said second tables being stored in the memory unit (150), such that said first table or said second table can be called up, in such a manner that, depending on the data bit-stream, the samples can be alternately output from the first table (151) to output a logic one or from the second table (152) to output a logic zero, using the same said at least one clock generator; and wherein each table (151, 152) is divided into n areas, the respective first samples each being phase-shifted through $2*\pi/n$.

2. The automation device of claim 1, wherein the microcontroller is connected to a data source and a data sink.

3. The automation device of claim 2, wherein the data source comprises a configurable sensor for converting a physical variable into an electrical variable, and wherein the data sink comprises a configuration of the sensor.

4. The automation device of claim 2, wherein the data sink comprises an actuator for converting an electrical variable into a physical variable whose properties can be diagnosed, and wherein the data source comprises a diagnostic device for diagnosing the physical variable.

* * * * *